United States Patent
Field et al.

(10) Patent No.: US 10,486,837 B2
(45) Date of Patent: Nov. 26, 2019

(54) PAYLOAD DISPENSING SYSTEM

(71) Applicant: WorldVu Satellites Limited, St Helier, Jersey (GB)

(72) Inventors: Daniel W. Field, Sunnyvale, CA (US); Armen Askijian, Sunnyvale, CA (US); James Grossman, Sunnyvale, CA (US); Alexander D. Smith, San Jose, CA (US)

(73) Assignee: WORLDVU SATELLITES LIMITED, Jersey Channel Islands (GB)

( * ) Notice: Subject to any disclaimer, the term of this patent is extended or adjusted under 35 U.S.C. 154(b) by 1192 days.

(21) Appl. No.: 14/745,527

(22) Filed: Jun. 22, 2015

(65) Prior Publication Data

US 2016/0368625 A1    Dec. 22, 2016

(51) Int. Cl.
*B64G 1/64* (2006.01)

(52) U.S. Cl.
CPC ........ *B64G 1/641* (2013.01); *B64G 2001/643* (2013.01)

(58) Field of Classification Search
CPC ................... B64G 1/641; B64G 1/64
See application file for complete search history.

(56) References Cited

U.S. PATENT DOCUMENTS

| | | | | |
|---|---|---|---|---|
| 5,152,482 A * | 10/1992 | Perkins | .............. | B64G 1/22 244/159.4 |
| 5,613,653 A | 3/1997 | Bombled et al. | | |
| 5,884,866 A * | 3/1999 | Steinmeyer | ............ | B64G 1/002 244/137.1 |
| 6,296,206 B1 * | 10/2001 | Chamness | ................ | B64G 1/00 244/173.3 |
| 8,096,512 B2 * | 1/2012 | Russell | ................. | B64D 47/00 244/159.4 |
| 2002/0179776 A1 * | 12/2002 | Mueller | ................ | B64G 1/007 244/158.5 |
| 2005/0045771 A1 * | 3/2005 | Caldwell | ............... | B64G 1/002 244/137.4 |
| 2011/0240802 A1 | 10/2011 | Balinov | | |
| 2012/0112010 A1 * | 5/2012 | Young | ................... | B64G 1/641 244/173.1 |
| 2014/0319283 A1 * | 10/2014 | Holemans | ............. | B64G 1/641 244/173.3 |

(Continued)

FOREIGN PATENT DOCUMENTS

| | | |
|---|---|---|
| EP | 1038772 A2 | 9/2000 |
| FR | 2717770 A1 | 9/1995 |

(Continued)

OTHER PUBLICATIONS

Authorized Officer: Carlos Weber, "International Search Report and Written Opinion", dated Sep. 8, 2016, PCT Application No. PCT/IB2016/053723, 10 pp.

(Continued)

*Primary Examiner* — Justin M Benedik
(74) *Attorney, Agent, or Firm* — Sughrue Mion, PLLC

(57) ABSTRACT

A payload dispenser and a method for populating same with satellites is disclosed. The payload dispenser comprises a shell. A plurality of rail assemblies are each configured to receive plural satellites. The satellite laden rail assemblies are then coupled to the shell.

19 Claims, 7 Drawing Sheets

(56) References Cited

U.S. PATENT DOCUMENTS

2016/0288928 A1    10/2016  Smith et al.
2016/0368625 A1*   12/2016  Field ...................... B64G 1/641

FOREIGN PATENT DOCUMENTS

FR          2938825 A1      5/2010
WO     WO-2010061078 A1 *   6/2010   ............. B64G 1/641

OTHER PUBLICATIONS

Authorized Officer: Ikonen, Tuija, "International Preliminary Report on Patentability" dated Sep. 1, 2017 in PCT Application No. PCT/IB2016/053723.
Authorized Officer: Danny Yap Ming Ann (Mr), Written Opinion issued in SG application No. 11201710729Q, dated Jul. 2, 2018, 5 pp.

* cited by examiner

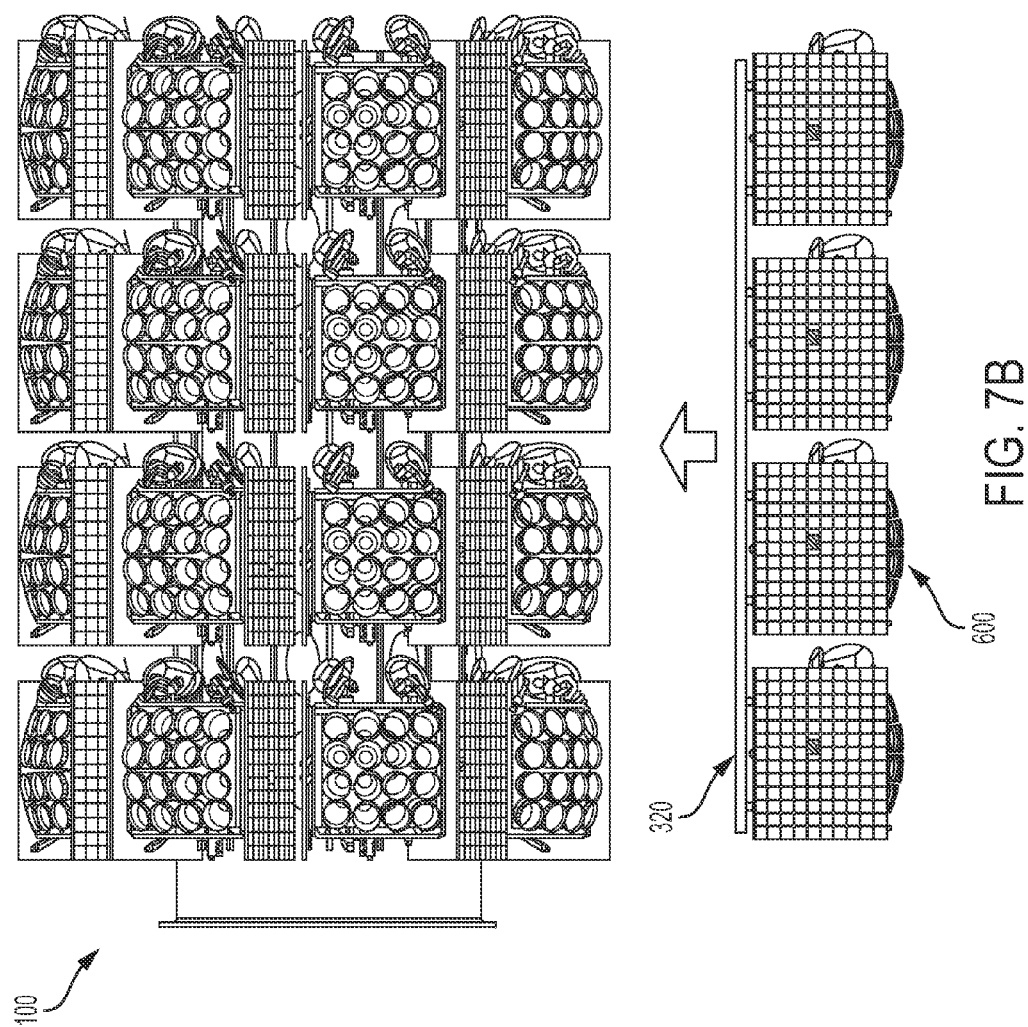

PAYLOAD DISPENSING SYSTEM

FIELD OF THE INVENTION

The present invention relates to earth-orbiting communication satellites, and, more particularly, a system and method for assembling and deploying multiple satellites from a launch vehicle.

BACKGROUND OF THE INVENTION

Satellites, such as communications satellites, are typically placed in orbit via a multistage launch vehicle. The launch vehicle carries one or perhaps a few satellites to an insertion orbit at which point the satellites separate from the launch vehicle and fly to their final operational orbit.

A great deal of time is spent at the launch site to prepare a satellite for launch. In particular, with current practice, it takes a substantial amount of time to mount and integrate a single satellite into a launch vehicle. And for launches in which the launch vehicle will carry multiple satellites, that already-substantial amount of time is multiplied by the number of satellites that are being launched.

It is expected that satellite constellations having a very large number of satellites (>500 satellites) will be deployed in the future. For such systems to be financially feasible, it will be necessary to launch a relatively large number of satellites (10-100) in a single launch vehicle. Due to the time issue raised above, in addition to any other constraints, new approaches for satellite launch must be developed.

SUMMARY OF THE INVENTION

The present invention provides a way to launch satellites that avoids some of the drawbacks of the prior art. In accordance with the illustrative embodiment, satellites are coupled to a payload dispensing system that, once populated with satellites, is placed in a launch vehicle.

The payload dispensing system includes a payload dispenser and a plurality of rail assemblies. In the illustrative embodiment, the payload dispenser is a shell in the form of a cylindrical tube. Each rail assembly comprises two rails and a plurality of couplings attached thereto and arranged as cross-members, the rail assembly thus presenting a ladder-like form. The couplings facilitate: (1) coupling satellites to the rail assembly and (2) coupling the satellite-laden rail assembly to the payload dispenser.

Each rail assembly is capable of receiving multiple satellites and the shell is capable of accommodating a plurality of satellite-laden rail assemblies. In this manner, the payload dispenser is capable of accommodating many satellites.

In operation, plural satellites are loaded onto a rail assembly. Each satellite is coupled to the rail assembly by attaching two of the couplings (cross-members) to a panel of the satellite. In typical embodiments, as few as 2 and as many as 10 satellites are attached to each rail assembly.

The foregoing operation is the most time-intensive part of the pre-launch process. This operation can be performed at the satellite manufacturing facility, an integration facility adjacent to the launch site, or at some other convenient facility. Multiple teams of technicians can work on multiple rail assemblies at the same time. Because of this parallel approach to satellite-preloading and assuming that the manpower is available, it will take no more time to populate nine rail assemblies with satellites than it would take to populate a single rail assembly. Furthermore, to the extent there is a problem on a particular rail assembly, it will not slow the preloading process that is proceeding on other rail assemblies.

Once completed, the preloaded rail assemblies are transported to the launch site and coupled to the shell. Connecting the rail assemblies to the shell is a relatively quick process, since it simply requires bolting the rail assemblies thereto and performing connector mating operations, both of which can be accomplished quite efficiently. The payload dispenser, now fully populated with satellites, is then placed in the region of the launch vehicle designated for the payload (i.e., the volume defined within the payload fairings).

The cost and schedule savings realizable using the inventive system is substantial. Consider a launch vehicle—a rocket—that will be used to launch 36 satellites into orbit. Assume that integrating a single satellite to a common payload dispenser, in accordance with the prior art, typically takes a minimum of 4 hours. As a consequence, the methods of the prior-art will require: 36 satellites×4 hours/satellite=144 hours (6 days of round-the-clock effort) to fully populate the prior-art dispenser for launch.

In accordance with the present teachings, a payload dispenser is populated with 36 satellites by attaching four satellites to each of nine rail assemblies, and then attaching the rail assemblies to the shell. As previously noted, this can be performed at the satellite manufacturing facility. It is expected that attaching a populated rail assembly to the shell will take about half of the time (c.a., 2 hours) that it takes to attach a single satellite (to a payload dispenser) because of the simplified nature of the connections. Thus, using embodiments of the present invention, it would take only about 18 hours (<1 day) to fully populate the payload dispenser, which is 12.5% of the time it would take using prior art methods.

BRIEF DESCRIPTION OF THE DRAWINGS

FIGS. 7A and 7B depict respective side and top views of the payload dispenser being populated with satellites by coupling satellite-bearing rail assemblies to the payload dispenser of FIG. 1.

DETAILED DESCRIPTION

Embodiments of the present invention can be used in conjunction with many types of satellites (e.g., LEO, GEO, etc.). The satellite depicted in conjunction with the illustrative embodiment is an LEO communications satellite for internet communications, such as described in U.S. patent application Ser. No. 14/673,170 filed Mar. 30, 2015 and incorporated by reference herein.

Figure 2:
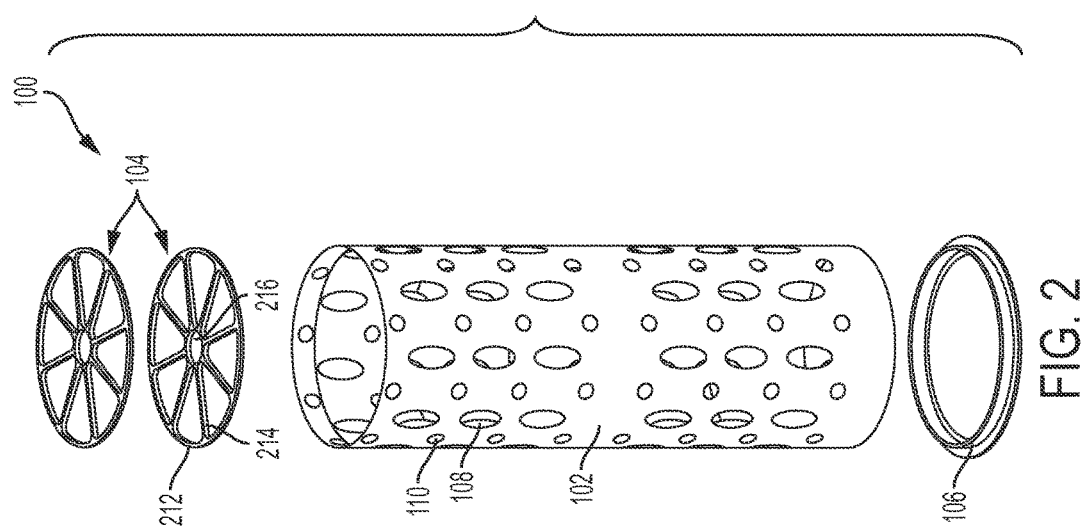
FIG. 2 depicts an exploded view of the payload dispenser.
Figure 1:
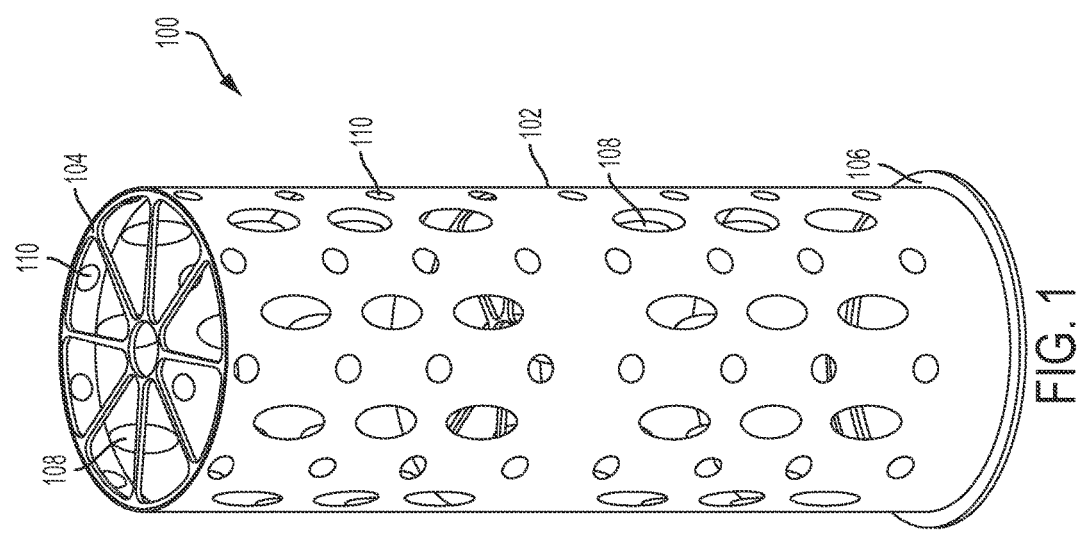
FIG. 1 depicts a perspective view of a payload dispenser in accordance with the illustrative embodiment of the present invention.

FIGS. 1 and 2 depict a perspective view and an "exploded" view, respectively, of payload dispenser 100 in accordance with the illustrative embodiment of the present invention. The salient features of payload dispenser 100 include: shell 102, shell support braces 104, and payload attach fitting 106, configured as shown.

In the illustrative embodiment, shell 102 is in the form of a cylindrical tube. In some other embodiments, shell 102 has a different configuration (e.g., an open-form cage, etc.). Shell 102 must be relatively light weight, capable of supporting plural satellites, and able to withstand extreme launch loads and vibration. To that end, shell 102 is formed from an appropriate material and, in some embodiments, is appropriately reinforced.

With regard to materials of construction, in some embodiments, shell 102 comprises a carbon-composite solid laminate, such as is formed, for example, using RS-36 epoxy with T700 carbon fiber, available from TenCate Advanced Composites of Almelo, Netherlands. Other light-weight and suitably strong materials known in the aerospace or related arts may suitably be used.

In the illustrative embodiment, shell 102 is further strengthened by shell support braces 104. These braces, which are disposed inside of shell 102, ensure that shell 102 maintains its cross-sectional shape (i.e., circular in the illustrative embodiment) under extreme loads and/or vibration, such as experienced during launch. An unbraced shell having a circular cross section might otherwise tend to ovalize under such conditions.

In the illustrative embodiment, shell support braces 104 are shaped like "wagon wheels," having felloes 208, spokes 210, and hub 212. This configuration provides excellent radial stiffness as a function of its weight and is therefore well suited for use as internal bracing for shell 102. To perform its intended function, braces 104 have an outer diameter that is just slightly smaller (about 1 millimeter or less) than the inner diameter of shell 102. In some embodiments, each shell support brace 104 comprises a carbon/aluminum honeycomb core with carbon fiber (e.g., TenCate T700, etc.) facing.

Payload attach fitting ("PAF") 106 couples payload dispenser 100 to the launch vehicle's upper stage. In some embodiments, PAF 106 comprises a carbon composite solid laminate, such as quasi-isotropic T700 carbon fiber and RS-36 epoxy.

Figure 4:
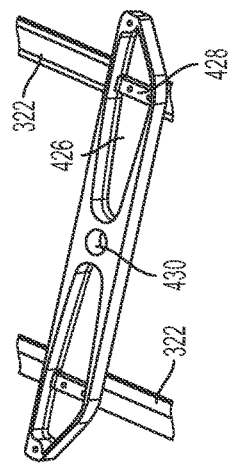
FIG. 4 depicts a perspective view of a coupling of the rail assembly of FIG. 3.
Figure 3:
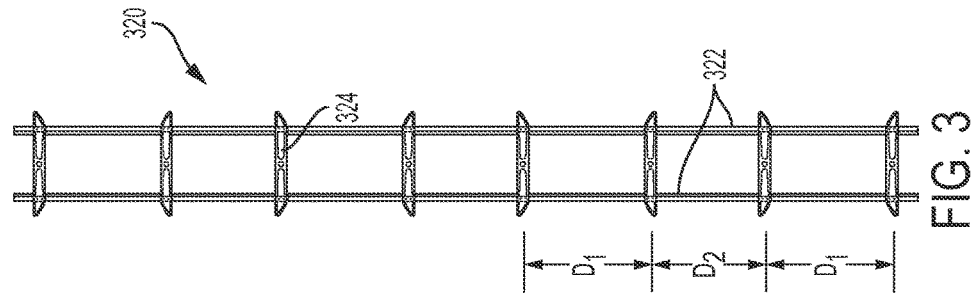
FIG. 3 depicts an illustrative embodiment of the rail assembly for use with the payload dispenser of FIG. 1.

FIG. 3 depicts rail assembly 320. In the illustrative embodiment, the rail assembly comprises two rails 322 that are parallel to one another and a plurality of couplings 324. The couplings are arranged like rungs on a ladder. Referring now to FIG. 4 as well as FIG. 3, in the illustrative embodiment, each coupling 324 is attached to both of rails 322. In the illustrative embodiment, two fasteners 428 are used to fasten each coupling 324 to the rails; however, more than two fasteners can be used. Cutouts 426 provide weight savings while keep the coupling stiff. In the illustrative embodiment, rails 322 are extruded aluminum and couplings 324 are machined billets of aluminum.

Two couplings 324 are used to attach a satellite to rail assembly 320. Spacing $D_1$ between paired couplings 324 is a function of the size and design of the satellite being launched. Spacing $D_2$ between adjacent sets of paired couplings must be sufficient to accommodate any external features of the satellite, such as appended antennas, etc.

Opening 424 in each coupling 324 receives a fastening element (bolt, etc.) to attach rail assembly 320 to payload dispenser 100 at openings 110 after all satellites are coupled to the rail assembly. It will be appreciated that rail assembly 320 and shell 102 must be designed in concert with one another and in light of the payload (i.e., the satellites), since the satellite dimensions and configuration will affect placement of couplings 324 and openings 110 in shell 102 must be appropriately placed to align with the couplings. Additional flexibility could be provided by using slots, rather than openings 110, but the lack of positive support (i.e., holes) for rail assemblies 320 might result in slippage of the satellite-laden rail assemblies under the launch loads.

Brackets (not depicted) connect a satellite separation system (not depicted) to couplings 324. Satellite separation systems, which are well known to those skilled in the art, typically comprises either pyros (explosive bolts) or non-explosive release actuators, such as ERM actuators available from TiNi Aerospace of San Rafael, Calif. Timing between satellite deployments can be controlled in a variety of ways, including, without limitation, a built-in time delay, an automatic deployment once the launch vehicle has moved to a new orientation, or manually commanded release from a control station on the ground.

Figure 5:
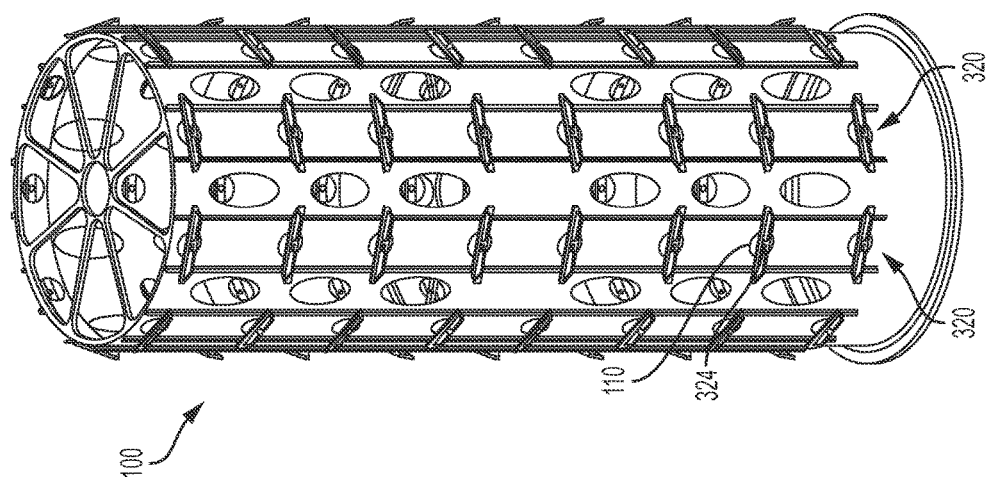
FIG. 5 depicts the payload dispenser of FIG. 1 with rail assemblies coupled thereto.

FIG. 5 depicts payload dispenser 100 with rail assemblies 320 attached. It is to be understood that the rail assemblies 320 are typically attached to the payload dispenser only after satellites have been coupled to the rail assemblies. Rail assemblies 320 are shown coupled to the dispenser without any satellites attached for pedagogical purposes.

As depicted in FIG. 5, rail assemblies 320 are attached to payload dispenser 100 at openings 110. A fastening element (bolt, etc.) extends through hole 430 in coupling 324 and passes through one of the openings 110 in shell 102. In the illustrative embodiment, nine rail assemblies 320, each having eight couplings 324, are attached to the payload dispenser.

Figure 6:
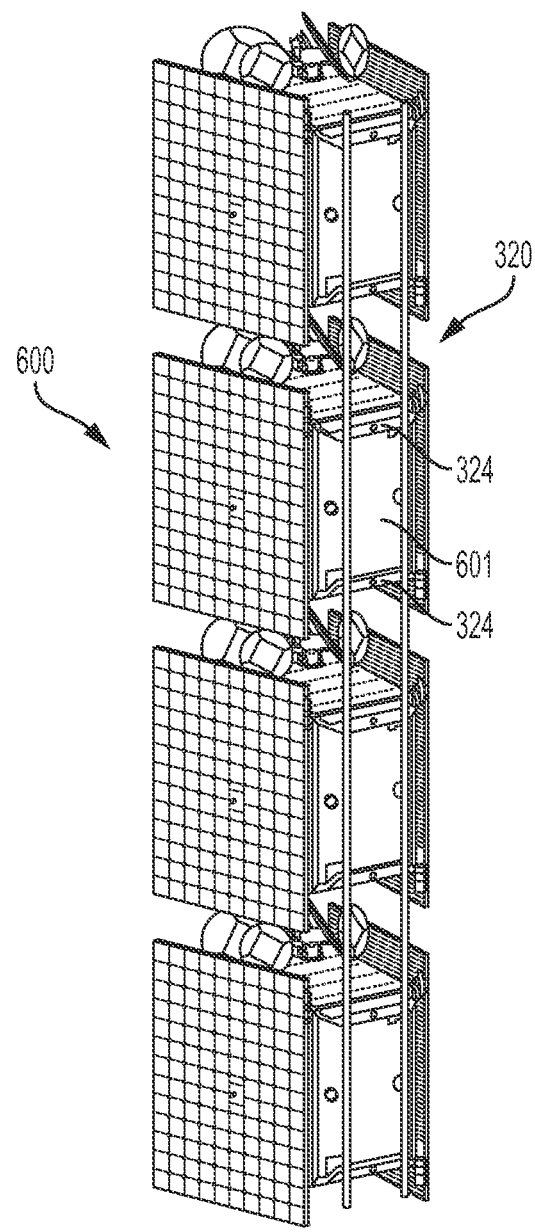
FIG. 6 depicts four satellites coupled to the rail assembly of FIG. 3.

FIG. 6 depicts four satellites 600 attached to rail assembly 320. Panel 601 of each satellite 600 couples to paired couplings 324 of the rail assembly.

Figure 7A:
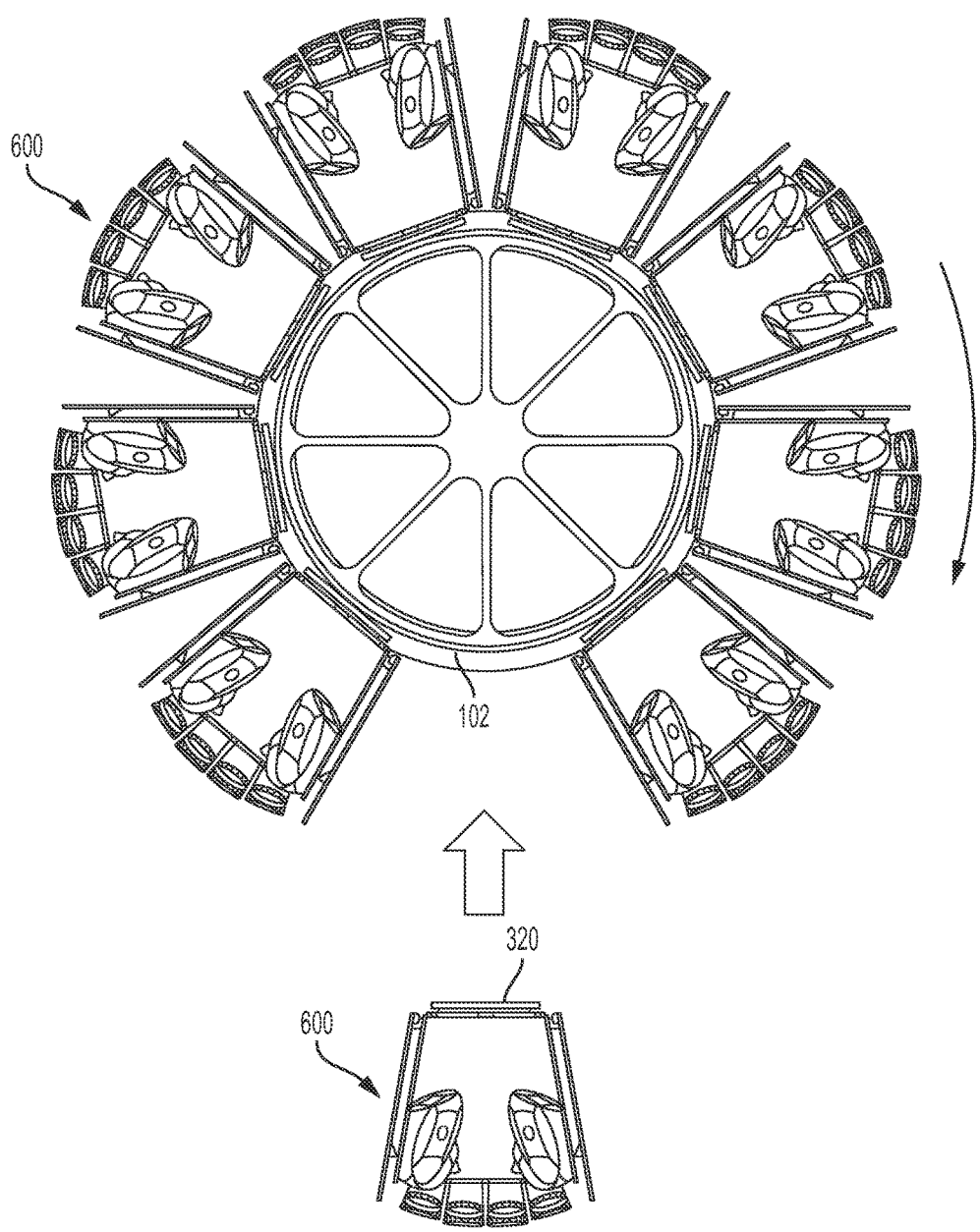

FIGS. 7A and 7B depict respective end and side views of payload dispenser 100 having eight satellite-laden rail assemblies 320 attached thereto. A ninth rail assembly 320 having four satellites 600 attached (see also FIG. 6) is being coupled to the payload dispenser to fully populate it.

In some embodiments, a satellite-laden rail assembly 320 is attached to payload dispenser 100 as follows. The payload dispenser is supported horizontally via typical ground support equipment (not depicted) that enables it to be spun (in the manner of a rotisserie). A rail assembly 320 is positioned below dispenser 100. A "row" (in the horizontal orientation) of holes 110 (see, e.g., FIGS. 1 and 2) in shell 102 is moved into alignment with opening 430 in each coupling 324 in the rail assembly by rotating the payload dispenser. The satellite-laden rail assembly 320 is then lifted, as necessary, so the fastening element that was positioned in opening 430 (prior to attaching the satellites) extends through opening 110. The fastener is fastened (e.g., using a nut and washer, etc.) by a technician, thereby securing rail assembly 320 to shell 102. Technicians involved in this process are situated inside of shell 102.

After a satellite-laden rail assembly 320 is attached to shell 102, the shell is rotated and another satellite-laden rail assembly is moved into position for attachment to the shell. The process is repeated until all satellite-laden rail assemblies 320 are attached to payload dispenser 102.

Depending on the launch vehicle being used, fully populated payload dispenser 100 is then either (1) bolted to into the payload region of a horizontal rocket that is then upended vertically or (2) the payload dispenser is tilted-up vertically and craned into position and situated in the payload volume of the upright launch vehicle.

It will be appreciated that the dimensions of payload dispenser 100 and the design of the rail assembly must be compatible with the satellites being launched as well as the launch vehicle being used.

Figure 8B:
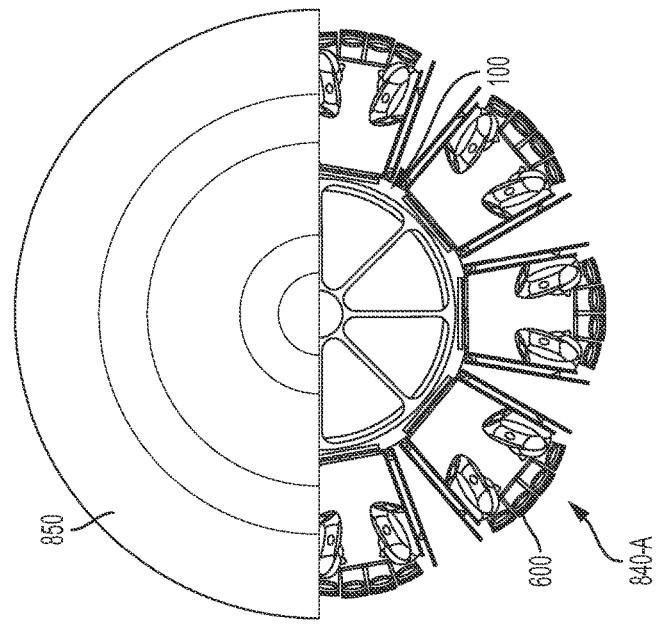
FIGS. 8A and 8B depict respective side and top views of a fully populated payload dispenser in the launch fairing of a launch vehicle.
Figure 8A:
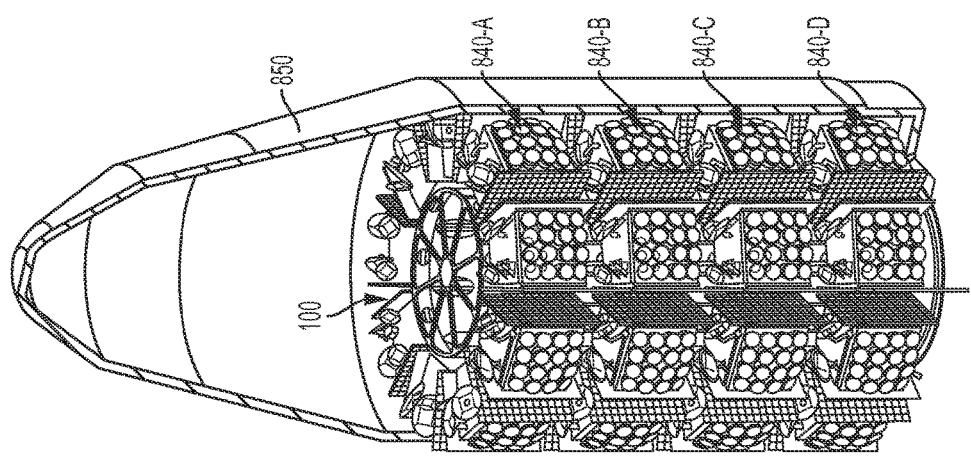

FIGS. 8A and 8B depict fully populated payload dispenser 100 in the payload volume defined by payload fairing 850 (one-half of the fairing is removed in FIGS. 8A and 8B for clarity), which is located atop of a launch vehicle. Fairing 850 protects the satellites against aerodynamic, thermal and acoustic environments that the launch vehicle experiences during atmospheric flight. In the illustrative embodiment, there are nine rail assemblies 320, each carrying four satellites 600, for a total of thirty-six satellites coupled to payload dispenser 100.

As best seen in FIG. 8A, the satellites present as being arranged in four "rings" 840A, 840B, 840C, and 840D. Although the rings do not have any physical significance, when the satellites are actually deployed, they are deployed ring-by-ring.

More particularly, after the launch vehicle has left the atmosphere, fairing 850 is jettisoned by pyrotechnically or hydraulically actuated systems. The fairing is typically composed of 2 "clamshell" halves. In some embodiments, the fairing-separation system includes longitudinal and lateral mechanical locks linked together by pushing rods and connected to pyro pushers. Four vertical jacks powered by a pyrotechnic gas generator are used to open and rotate the two fairing halves. Final jettisoning of the fairing halves is provided by lateral springs. Separation of the fairing occurs during second stage flight, after the launcher has left the dense portion of the atmosphere such that aerodynamic and thermal loads are at acceptable levels for the payload (i.e., satellites).

With the fairing gone, the satellites can separate freely once in final position. A few (1-3) satellites, but not all satellites, from the same "ring" are deployed at a time. In various embodiments, a time delay and/or a change in the launch vehicle's orientation or velocity is required between each subsequent satellite deployment.

EXAMPLE

Assume that a Soyuz 2 rocket is used as the launch vehicle and the satellites being launch are those described in U.S. patent application Ser. No. 14/673,170. For this example, each satellite is assumed to have the following dimensions:
  Bottom panel (which attaches to rail assembly): 0.5 meters×0.8 meters
  Height of satellite (from base to top of horn support web): 0.95 meters
  Top panel: 0.8 meters×0.8 meters
The approximate dimensions of the payload region of the Soyuz rocket are:
  Height (including step): 5.4 meters
  Diameter: 3.8 meters
Since the diameter of the payload region is 3.8 meters, the maximum allowable diameter of the satellite-laden payload dispenser 100 is about 3.7 meters, allowing about 50 millimeters clearance between the satellites and the payload fairing of the rocket on all sides. The diameter of the satellite-laden payload dispenser is approximately:

$D$=diameter of shell 102+2×height of the satellite

Thus, diameter of shell 102 can be a maximum of about 3.7−2×0.95=1.8 meters. Shell 102 comprises a carbon-composite solid laminate (e.g., RS-36 epoxy with T700 carbon fiber) and has a wall thickness that tapers from a thickness of 3 millimeters at the top of shell 102 tube to 7 millimeters at the bottom thereof.

The height of shell 102 is not strictly limited by the height of straight region of the fairing. A height for the shell of about 5.1 meters is selected. Rail assembly 320 has a length that is no more than (and typically somewhat less than) the height of shell 102. In this example, the length of rail assemblies 320 is about 4.7 meters. Each rail assembly 320 includes 8 couplings 324 for attaching four satellites to the rail assembly. Paired couplings are spaced apart by about 0.64 meters (center-to-center) and the distance between adjacent pairs of couplings is about 0.61 meters (center-to-center).

Figure 9:
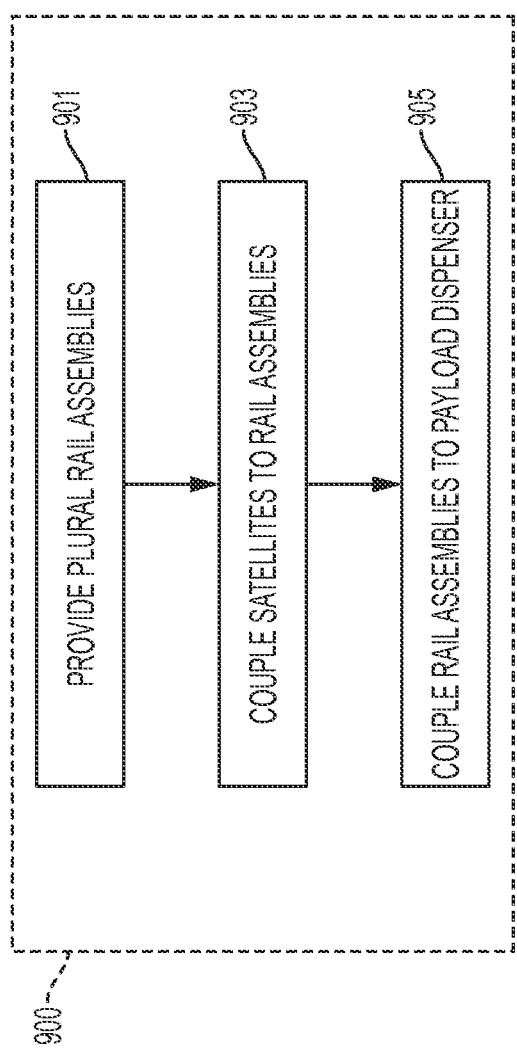
FIG. 9 depicts a method for preparing satellites for launch in accordance with an illustrative embodiment of the invention.

In a further aspect of the invention, FIG. 9 depicts method 900 for launching a plurality of satellites. Per operation 901, a plurality of rail assemblies, such as rail assemblies 320, are provided. As previously discussed, the rail assemblies must be compatibly sized and arranged to (1) receive a satellite, (2) to receive the desired number of satellites, and (3) attach to payload dispenser 100.

In operation 903, the satellites are coupled to rail assemblies 320. As noted previously, this process can be performed in parallel, with satellites being coupled to the plural rail assemblies at the same time. The satellites are attached to the rail assemblies at couplings 324, two couplings per satellite. Brackets (not depicted) connect a satellite separation system (not depicted) to the couplings. Before attaching each satellite to a rail assembly, a fastening element is positioned in opening 430 of each coupling 324 in preparation for operation 905.

Satellite-laden rail assemblies 320 are attached to payload dispenser 100 in operation 905. As previously disclosed, in some embodiments, this operation is accomplished as follows. Payload dispenser 100 is supported, in a horizontal orientation, for rotational movement. A satellite-laden rail assembly 320 is positioned below payload dispenser 100. The dispenser is rotated to bring a "row" (in the horizontal orientation) of holes 110 (see FIGS. 1 and 2) in shell 102 into alignment with opening 430 in each coupling 324 in the rail assembly. The satellite-laden rail assembly 320 is then lifted to so that the fastening element extending from opening 430 in each coupling extends through opening 110 in dispenser 100. A technician working inside of payload dispenser 100 fastens the fastener, thereby securing rail assembly 320 to shell 102.

After a given satellite-laden rail assembly 320 is attached, the payload dispenser is rotated and another satellite-laden rail assembly is moved into position for attachment. The process is repeated until all satellite-laden rail assemblies 320 are attached to payload dispenser 102.

After payload dispenser 100 is populated with the requisite amount of satellites, it is then coupled to the launch vehicle.

It is to be understood that the disclosure describes a few embodiments and that many variations of the invention can easily be devised by those skilled in the art after reading this disclosure and that the scope of the present invention is to be determined by the following claims.

What is claimed is:

1. A system for dispensing a plurality of satellites, comprising:
   a plurality of rail assemblies, wherein each rail assembly comprises two spaced-apart rails and at least four couplings disposed orthogonally with respect to the rails, and wherein the couplings are arranged in pairs, and further wherein each pair of couplings is dimensioned and arranged to couple to a satellite such that the four couplings of each rail assembly are capable of coupling to at least two satellites; and a payload dispenser, the payload dispenser including a shell, wherein the shell is physically adapted to securely engage the plurality of rail assemblies.

2. The system of claim 1 wherein the shell comprises a cylindrical tube, and further wherein the cylindrical tube comprises a plurality of openings arranged in plural columns along a length of the cylindrical tube, wherein at least some of the plurality of openings in a respective column are positioned to receive a respective fastening member extending from each coupling in a respective rail assembly.

3. The system of claim 2 wherein the cylindrical tube has an outer diameter in a range of about 1 meter to about 2 meters.

4. The system of claim 3 wherein the cylindrical tube has a length in a range of about 3 meters to about 5.5 meters.

5. The system of claim 1 wherein the rails and the couplings comprise aluminum.

6. The system of claim 1 wherein the shell comprises a carbon-composite solid laminate.

7. The system of claim 1 further comprising a plurality of shell support braces, wherein the shell support braces are disposed within the shell and are physically adapted to prevent a cross-sectional shape of the shell from deforming under load or vibration.

8. The system of claim 1 wherein the payload dispenser is dimensioned and arranged to couple to nine rail assemblies, and wherein each rail assembly is dimensioned and arranged to couple to four satellites.

9. A system for dispensing a plurality of satellites, comprising:
a plurality of rail assemblies, wherein each rail assembly comprises two spaced-apart rails and a plurality of couplings attached to the rails in a ladder configuration, wherein the couplings are arranged in pairs, and wherein each pair thereof being dimensioned and arranged to couple to a satellite; and
a payload dispenser, the payload dispenser comprising a tube that is physically adapted to securely engage the plurality of rail assemblies when populated with satellites.

10. The system of claim 9 wherein each coupling in each rail assembly comprises a centrally located opening, at least some of which openings receive a fastening element that fastens the rail assembly and the tube to one another.

11. The system of claim 9 wherein the tube is internally reinforced to prevent deformation of a cross-sectional shape of the tube under load or vibration.

12. The system of claim 9 wherein each rail assembly receives at least three satellites.

13. A method for populating a payload dispenser with a first plurality of satellites, wherein the method comprises:
providing a plurality of rail assemblies, each rail assembly comprising at least two pairs of couplings, each of which pairs is dimensioned and arranged to couple to one satellite;
coupling the first plurality of satellites to the plurality of rail assemblies; and
coupling the plurality of rail assemblies, with the first plurality of satellites attached thereto, to the payload dispenser.

14. The method of claim 13 wherein coupling the first plurality of satellites to the plurality of rail assemblies further comprises performing the coupling of satellites to each rail assembly at the same time as one another.

15. The method of claim 13 wherein coupling the first plurality of satellites to the plurality of rail assemblies is performed at a location other than a launch site.

16. The method of claim 13 wherein coupling the plurality of rail assemblies to the payload dispenser further comprises orienting the payload dispenser in a horizontal position and supporting the payload dispenser for rotation about a longitudinal axis thereof.

17. The method of claim 16 and further comprising:
disposing a first one of the plurality of rail assemblies with satellites coupled thereto below the payload dispenser; and
fastening the couplings of the first one of the plurality of rail assemblies to the payload dispenser.

18. The method of claim 17 and further comprising:
rotating the payload dispenser to a second position;
disposing a second one of the plurality of rail assemblies with satellites coupled thereto below the payload dispenser; and
fastening the couplings of the second one of the plurality of rail assemblies to the payload dispenser.

19. The method of claim 17 wherein the fastening is performed from within the payload dispenser.

* * * * *